(12) United States Patent
Nagatoya (10) Patent No.: US 10,093,050 B2
(45) Date of Patent: Oct. 9, 2018

(54) LIQUID EJECTION APPARATUS WITH A NOZZEL CAP PARTIALLY MADE OF AN ELASTIC MEMBER AND PRODUCTION METHOD FOR THE LIQUID EJECTION APPARATUS

(71) Applicant: Seiko Epson Corporation, Tokyo (JP)

(72) Inventor: Satoshi Nagatoya, Azumino (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/363,128

(22) Filed: Nov. 29, 2016

(65) Prior Publication Data

US 2017/0157818 A1    Jun. 8, 2017

(30) Foreign Application Priority Data

Dec. 2, 2015 (JP) ................. 2015-235451

(51) Int. Cl.
*B29C 45/14* (2006.01)
*B41J 2/165* (2006.01)
*B29K 683/00* (2006.01)
*B29L 31/00* (2006.01)

(52) U.S. Cl.
CPC ....... *B29C 45/1418* (2013.01); *B41J 2/16505* (2013.01); *B29K 2683/00* (2013.01); *B29K 2995/0046* (2013.01); *B29L 2031/767* (2013.01)

(58) Field of Classification Search
CPC ............. B29C 45/1418; B41J 2/16505; B29L 2031/767; B29K 2995/0046; B29K 2683/00

See application file for complete search history.

(56) References Cited

U.S. PATENT DOCUMENTS

2015/0183226 A1    7/2015 Kudo

FOREIGN PATENT DOCUMENTS

JP    2001-341318 A    12/2001
JP    2015-123690 A    7/2015

*Primary Examiner* — Henok Legesse
(74) *Attorney, Agent, or Firm* — Harness, Dickey & Pierce, P.L.C.

(57) ABSTRACT

A liquid ejection apparatus includes a liquid ejection head including a nozzle forming face in which a plurality of nozzles through which liquid is ejected toward a droplet landing object are formed, and a protruding face protruding toward the droplet landing objet and disposed so as to surround the nozzle forming face, and a cap body including a bottom plate and a wall extending upwardly from the bottom plate and configured to seal the nozzle forming face within a sealing space formed by bringing a top portion of the wall into contact with the protruding face. Further, at minimum, a portion included in the wall and being brought into contact with the protruding portion is an elastic member including liquid repellency.

6 Claims, 5 Drawing Sheets

LIQUID EJECTION APPARATUS WITH A NOZZEL CAP PARTIALLY MADE OF AN ELASTIC MEMBER AND PRODUCTION METHOD FOR THE LIQUID EJECTION APPARATUS

BACKGROUND

1. Technical Field

The present invention relates to a liquid ejection apparatus, such as an inkjet recording apparatus, and a production method for a liquid ejection apparatus, and in particular, it relates to a liquid ejection apparatus equipped with a cap for sealing a nozzle forming face of a liquid ejection head, and a production method for such a liquid ejection apparatus.

2. Related Art

Examples of a liquid ejection head that allows liquid droplets to be ejected (discharged) through nozzles by causing pressure variations in liquids inside pressure chambers include, but are not limited to, an inkjet recording head (hereinafter referred to as just a recording head) for use in image recording apparatuses, such as an inkjet recording apparatus (hereinafter referred to as just a printer); a color material ejection head for use in manufacturing color filters for liquid crystal displays and the like; an electrode material ejection head for use in forming electrodes for electro luminescence displays, face emitting displays (FED), and the like; and a living organic material ejection head for use in manufacturing biotips (biochemical elements). Further, in the recording head for use in image recording apparatuses, inks in liquid form are ejected, and in the color material ejection heads for use in display manufacturing apparatuses, solutions for color materials in R (red), G (glean), and B (blue) colors are ejected. Further, in the electrode material ejection heads for use in electrode formation apparatuses, electrode materials in liquid form are ejected, and in the living organic material ejection heads for tip manufacturing apparatuses, solutions for living organic materials are ejected.

In the above printers, a cap for sealing a nozzle forming face of the recording head is provided in order to prevent solvents for inks from being vaporized through nozzles of the recording head, and to perform maintenance processing for forcibly discharging viscosity increased inks and air bubbles from the nozzles by supplying negative pressure to the nozzles. The cap is a tray-shaped member having elasticity and is configured to seal the nozzle forming face within a sealing space (a capping state) by bringing a head edge face (an opening periphery) of the cap into contact with a bottom face at which the nozzle forming face is disposed in the recording head. For example, in a printer disclosed in JP-A-2001-341318, a cap formed by integrally molding a cap portion made of a thermoplastic elastomer material having elasticity with a holder portion made of a relatively hard synthetic resin material by means of insert molding or two-color molding is employed.

In a configuration in which an elastomer material is used as a material of the cap, ink inside the cap is likely to creep up on portions on side walls of the cap, such as corner portions where adjacent side walls intersect with each other, because of a capillarity; reach a portion to be brought into contact with the bottom face of the recording head; and be adhered to the bottom face of the recording head during a capping operation. Further, there is a problem that, upon contact of the recording head with a recording medium, such as recording paper, the ink adhered on the bottom face of the recording head taints the recording medium. Further, among recording heads of recent years, a recording head configured to include a protruding face protruding from its nozzle forming face toward a side of a recording medium being subjected to printing, and to perform recording of images and/or the like in a state of allowing the protruding face to press the recording medium is proposed, but in such a configuration, when the ink is adhered on the protruding face, the ink is likely to taint the recording medium when the recording medium has been pressed by the protruding face. In order to prevent the above creep-up of the ink, a liquid repellent treatment on the cap is considered, but there is a problem that it is difficult to expect a durability performance enough to endure repeatedly executed capping operations.

SUMMARY

An object of the invention is that a liquid ejection apparatus and a production method for a liquid ejection apparatus are provided that realize minimization of tainting of a liquid ejection head due to creep-up of liquid in a cap.

According to an aspect of the invention, a liquid ejection apparatus includes a liquid ejection head including a nozzle forming face in which a plurality of nozzles through which liquid is ejected toward a droplet landing object are formed, and a protruding face protruding toward the droplet landing objet and disposed so as to surround the nozzle forming face, and a cap body including a bottom plate and a wall extending upwardly from the bottom plate and configured to seal the nozzle forming face within a sealing space formed by bringing a top portion of the wall into contact with the protruding face. Further, at minimum, a portion included in the wall and being brought into contact with the protruding portion is an elastic member including liquid repellency.

According to the one aspect of the invention, at minimum, a portion included in the wall and being brought into contact with the protruding portion is an elastic member including liquid repellency, and thus, even when the wall includes a plurality of walls, and because of a capillarity, the liquid moves toward top portions of the walls while passing through corner portions where adjacent ones of the walls intersect with each other, the liquid is unlikely to be adhered onto the elastic member. For this reason, the adherence of the liquid onto the bottom face (the protruding face) of the liquid ejection head during capping operations is reduced. As a result, when the liquid ejection head ejects liquid toward the droplet landing object, tainting of the droplet landing object by liquid having been adhered onto the bottom face of the liquid ejection head is reduced.

In the above configuration, preferably, a configuration in which the elastic member is made of silicone resin is employed.

According to this configuration, the silicone resin includes not only liquid repellency and elasticity but also a heat resistance and chemical stability. Moreover, its performance is maintained for a long time. Thus, the silicone resin is suitable as the elastic member.

In the above configuration, preferably, the elastic member is formed from the portion brought into contact with the protruding portion up to a face constituting the wall and located at a side of the sealing space, and a face constituting the bottom plate and located at a side of the sealing space.

According to this configuration, since the elastic member is formed up to the sealing space side face of the wall and the sealing space side face of the bottom plate, the liquid becomes unlikely to leak on the inner face of the cap body, and thus, the creep-up of the liquid is further reduced. Further, for example, during a maintenance operation, when pressure inside the sealing space becomes negative, the discharge of the liquid is further facilitated. With this configuration, the liquid becomes more unlikely to remain inside the cap body, and in this respect, the creep-up of the liquid is more effectively reduced.

Further, in the above configuration, when surface free energy of the elastic member on the wall is denoted by $\gamma 1$, surface free energy of the elastic member on the bottom plate is denoted by $\gamma 2$, and surface free energy on the cap body is denoted by $\gamma 3$, preferably, a configuration that satisfies a formula represented by $\gamma 1 < \gamma 2 \leq \gamma 3$ is employed.

With this configuration, both of the wall of the cap body and the bottom plate are allowed to keep the liquid repellency, and the liquid becomes more unlikely to leak on the wall. Thus, both of the reduction of the creep-up of the liquid and the improvement of the liquid elimination performance are simultaneously realized.

Further, in the above configuration, preferably, a discharge outlet configured to discharge the liquid to an outside of the liquid ejection apparatus and a groove extending from the wall to the discharge outlet are formed in the bottom plate, and the groove has a width whose size is enough to cause a capillarity in the liquid.

Further, in this configuration, preferably, a configuration that allows the width of the groove to taper toward the discharge outlet is employed.

With this configuration, the liquid is guided toward the discharge outlet because of the capillarity in the groove, and thus, both of the reduction of the creep-up of the liquid and the increase of the liquid elimination performance are simultaneously realized.

Further, a production method for a liquid ejection apparatus according to another aspect of the invention is a production method for the liquid ejection method according to the above configurations, and includes a process of forming the cap body through injection molding, and a process of integrally forming the cap body and the elastic member through insert molding.

Moreover, preferably, the above method further includes a process of performing a primer treatment that improves closeness of contact with the elastic member on a surface of the cap body.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments to practice the invention will be described with reference to the accompanying drawings. Here, it should be noticed that, in embodiments described below, various limitations are made to make the embodiments preferable specific examples of the invention, but the scope of the invention is not limited to the embodiments unless particularly stated that the invention is limited thereto. Further, in the following description, an inkjet recording apparatus (hereinafter referred to as a printer) will be taken as an example of a liquid ejection apparatus according to the invention.

Figure 1:
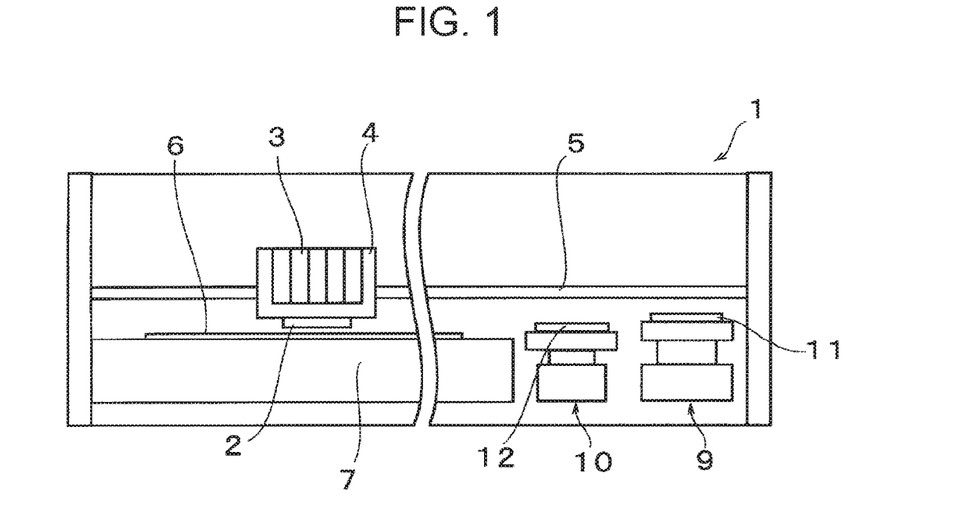
FIG. 1 is front view of a liquid ejection apparatus (a printer) illustrating an internal configuration of the liquid ejection apparatus.

FIG. 1 is a front view of a printer 1 illustrating an internal configuration of the printer 1. The printer 1 according to this embodiment includes a recording head 2, one type of liquid ejection heads. In the inside of the printer 1, the recording head 2 is secured to a bottom side portion of a carriage 4. This carriage 4 includes ink cartridges 3 (liquid supply sources) mounted therein. Further, the carriage 4 is configured to be capable of being reciprocated along a guide rod 5 by a carriage movement mechanism (not illustrated). The printer 1 performs recording of images and/or the like by allowing inks, corresponding to one type of the liquid in the one aspect of the invention, to be ejected through nozzles 35 of the recording head 2 and then be landed on a recording medium 6 (corresponding to the droplet landing object), such as recording paper, while allowing the recording head 2 to make a relative movement in a width direction of the recording medium 6 (i.e., in a main-scanning direction) in conjunction with sequential transports of the recording medium 6 on a platen 7. Here, a configuration in which the ink cartridges 3 are disposed at a body side of the printer and inks contained in the ink cartridges 3 are flown to a side of the recording head 2 through ink supply tubes may be employed.

A home position, a waiting position of the recording head 2, is set at a position at one outside of the platen 7 (the right side in FIG. 1) in the main-scanning direction. At this home position, a capping mechanism 9 and a wiping mechanism 10 are disposed in series from one side toward the other side of the printer 1. The capping mechanism 9 includes a cap 11, and is configured to be capable of being brought to a state (a capping state) of allowing the cap 11 to be in contact with and shield the bottom face (the lower face of a fixing plate 19 described later) of the recording head 2, or of being brought to a waiting state of allowing the cap 11 to be isolated from the bottom face of the recording head 2. Further, in the capping state, the evaporation of solvents of the inks through the nozzles 35 (see FIG. 2) is reduced. Moreover, in the capping state, maintenance processing (cleaning processing) for making pressure of a space inside the cap 11 negative, and causing inks to be sucked and discharged from the nozzles 35 into the cap 11. The detailed configuration of the cap 11 will be described later.

The wiping mechanism 10 is a mechanism for wiping out a nozzle forming face of the recording head 2 using a wiper 12, and is configured to be capable of being brought to a state of allowing the wiper 12 to be in contact with the nozzle forming face of the recording head 2, or of being brought to a waiting state of allowing the wiper 12 to be isolated from the nozzle forming face. Any one of variously configured types of wipers may be employed as the wiper 12. Here, for example, a wiper having a structure in which the surface of its blade body having elasticity is covered by cloth is used as the wiper 12. In this embodiment, the movement of the wiper 12 in the main-scanning direction in a state in which the wiper 12 is in contact with the nozzle forming face allows the wiper 12 to slide on and wipe the nozzle forming face. Here, a configuration that allows the wiper 12 itself to move and wipe the nozzle forming face in a state in which the movement of the recording head 2 is in a holt state may be also employed. That is, a configuration that allows the recording head 2 and the wiper 12 to move relative to each other is simply required.

Figure 2:
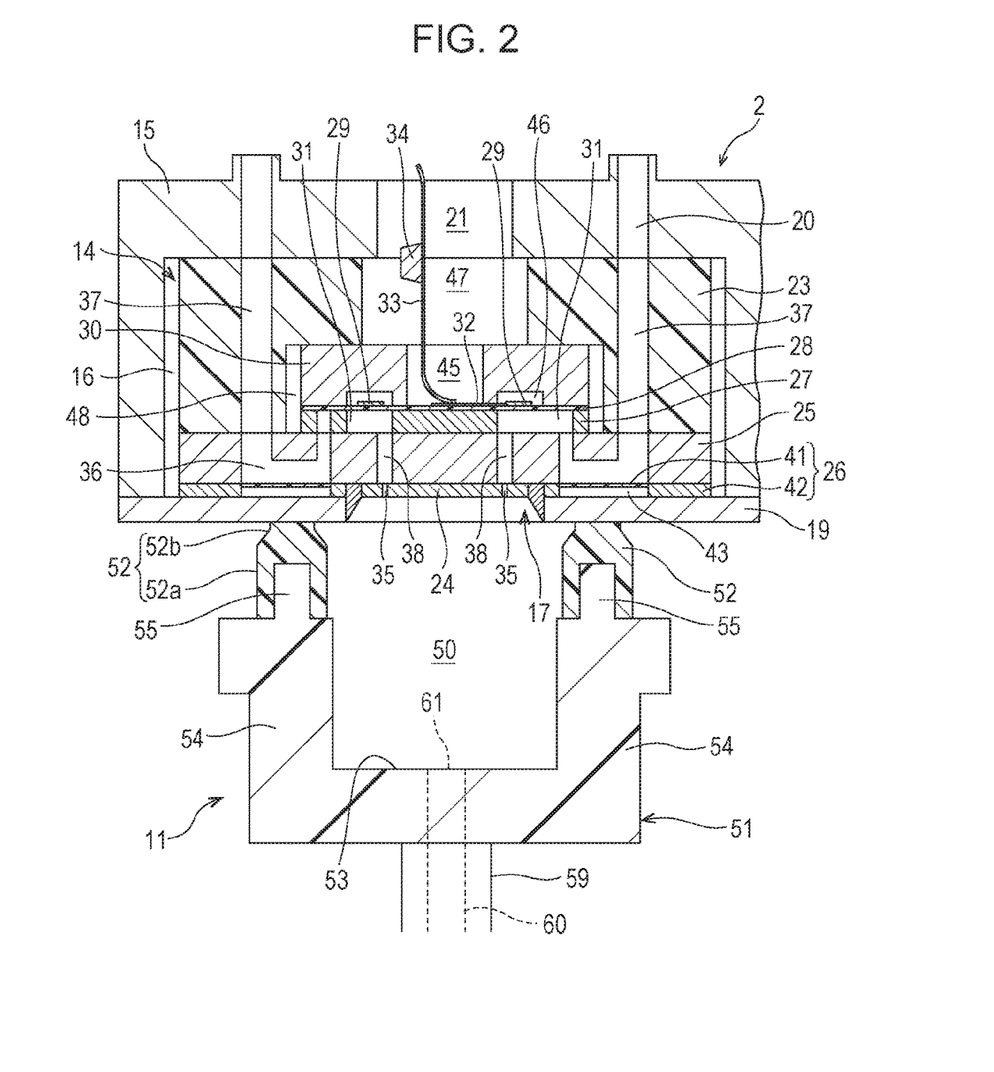
FIG. 2 is a cross-sectional view of a recording head illustrating a capping state of the recording head.

FIG. 2 is a cross-sectional view of the recording head 2 in the capping state of the capping mechanism 9. In this embodiment, the recording head 2 includes a head unit 14 and a unit holder 15. The unit holder 15 is a box-shaped member containing a container chamber 16, which is formed inside the unit holder 15. The container chamber 16 communicates with an opening the lower face side of the unit holder 15, and the head unit 14 is contained through this opening. The lower face of the head unit 14 inside the container chamber 16 is coupled to the fixing plate 19 having an opening portion 17. The fixing plate 19 is a metallic plate. Further, holder flow paths 20 are formed in the unit holder 15, and an ink from one of the ink cartridges 3 is introduced to each of the holder flow paths 20. Further, a holder opening portion 21 is disposed between a pair of the holder flow paths 20, and the holder opening 21 communicates with a penetration space portion 47 of a case 23 of the head unit 14.

The head unit 14 is configured to be secured to the case 23, which is made of synthetic resin, in a state in which a plurality of head unit constituent members are stacked. The head unit constituent members include a nozzle plate 24, a communication substrate 25, a compliance substrate 26, a pressure chamber formation substrate 27, an elastic film 28, piezoelectric elements 29, and a protection substrate 30. The pressure chamber formation substrate 27 is produced from a silicon single-crystal substrate (hereinafter referred to just a silicon substrate). In the pressure chamber formation substrate 27, a plurality of space portions for defining pressure chambers 31 are formed by means of anisotropic etching processing on the silicon substrate. The space portions are formed so as to penetrate in a thickness direction the pressure chamber formation substrate 27, and one opening portion of each of the space portions is sealed by the elastic film 28, and the other opening portion of the each of the space portions is sealed by the communication substrate 25 so as to define a corresponding one of the pressure chamber 31. Hereinafter, these space portions will also be collectively referred to as the pressure chambers 31. Through coupling of the pressure chamber formation substrate 27 to the communication substrate 25 described later in a state in which the alignment of the pressure chamber formation substrate 27 with the communication substrate 25 is made, one end of each of the pressure chambers 31 in its long side direction is brought into communication with a corresponding one of the nozzles 35 via a corresponding one of nozzle communication openings 38. Further the other end of the pressure chamber 31 in its long side direction is allowed to communicate with a common liquid chamber 36 of the communication substrate 25.

On the upper face of the pressure chamber formation substrate 27 (i.e., on the face opposite a coupling face coupled to the communication substrate 25), the elastic film 28 is formed in a state of sealing an upper opening of each of the pressure chambers 31. The elastic film 28 is formed of, for example, silicon dioxide. Further, an insulation film (not illustrated) is formed on the elastic film 28. This insulation film is formed of, for example, zirconium oxide. Further, the piezoelectric elements 29 are each formed at a position associated with a corresponding one of the pressure chambers 31 on the elastic film 28 and the insulation film. The piezoelectric element 29 in this embodiment is a so-called bending-mode piezoelectric element. The piezoelectric elements 29 are formed such that a metallic lower electrode film, a piezoelectric substance layer made of lead zirconate titanate (PZT) or the like, and a metallic upper electrode film (these being omitted from illustration) are sequentially stacked on the elastic film 28 and the insulation film, and then, patterning is performed for each of the pressure chamber 31. Further, one of the upper electrode film and the lower electrode film is formed as a common electrode, and the other one of the upper electrode film and the lower electrode film is formed as an individual electrode.

An electrode wiring portion 32 is extended from each of the piezoelectric elements 29 on the insulation film, and a terminal at one end of a flexible cable 33 is coupled to a portion equivalent to an electrode terminal of the electrode wiring portion 32. The flexible cable 33 is formed such that, for example, a conductive pattern is formed using a copper foil or the like on the surface of a base film made of polyimide or the like, and then this conductive pattern is coated by resist. A drive IC 34 is mounted on the surface of the flexible cable 33, and this drive IC 34 drives a corresponding one of the piezoelectric element 29. A drive signal (a drive voltage) is selectively applied to between the upper electrode film and the lower electrode film by being controlled by the drive IC 34 so as to cause bending deformation of a corresponding one of the electrode element 29. Here, a configuration in which the drive IC 34 is not disposed on the flexible cable 33, but is disposed on the protection substrate 30 described later may be also employed.

The communication substrate 25, which is coupled to the lower face of the pressure chamber formation substrate 27, is a plate member produced from a silicon substrate, just line the pressure chamber formation substrate 27. In the communication substrate 25, the common liquid chamber 36, which is a space portion common to pressure chambers 31 constituting a pressure chamber row, is formed by means of anisotropic etching. An ink from one of the ink cartridges 3 is flown into the common liquid chamber 36 through the holder flow path 20 and a case flow path 37. The common liquid chamber 36 is a space portion formed along an alignment direction of the pressure chambers 31. One end of the common liquid chamber 36 in a pressure chamber long side direction communicates with the case flow path 37, whereas the other end of the common liquid chamber 36 in the pressure chamber long side direction individually communicates with each of the pressure chambers 31 of the pressure chamber formation substrate 27. Further, the nozzle communication openings 38 are formed in the communication substrate 25 in a state of penetrating in a substrate-thickness direction of the nozzle communication openings 38. One end (an upper end) of each of the nozzle communication openings 38 communicates with an end portion of a corresponding one of the pressure chambers 31, whereas the other end (a lower end) of the nozzle communication opening 38 communicates with a corresponding one of the nozzles 35 of the nozzle plate 24.

The above nozzle plate 24 is a plate member in which the plurality of nozzles 35 are formed in rows at intervals of a pitch corresponding to a dot formation density. In this embodiment, two nozzle rows are formed in the nozzle plate 24. The nozzle plate 24 in this embodiment is produced from a silicon substrate. Further, the nozzles 35, each having a cylindrical shape, are formed by performing dry etching on the silicon substrate. The size of the nozzle plate 24 is set so as to be smaller than that of the communication substrate 25. Particularly, the size of the nozzle plate 24 in a direction orthogonal to a nozzle-row direction is sufficiently smaller than the size of the communication substrate 25 in the direction orthogonal to the nozzle-row direction. Through coupling of the nozzle plate 24 to the communication substrate 25 in a state in which the alignment of the nozzle plate 24 with the communication substrate 25 is made, each of the nozzle communication openings 38 of the communication substrate 25 is brought into communication with a corresponding one of the nozzles 35.

The compliance substrate 26 is coupled to a portion at the periphery of the nozzle plate 24, which is disposed on the lower face of the communication substrate 25. The compliance substrate 26 is formed of a thin compliance sheet 41, such as a polyphenylene sulfide (PPS) sheet, and a metallic support plate 42 supporting the compliance sheet 41. Any flexible member capable of bending in accordance with the variation of pressure inside an ink flow path (the common liquid chamber 36) may be used as the compliance sheet 41. For example, a very thin metallic plate, such as a stainless steel plate, may be used as the compliance sheet 41. In a portion corresponding to the common liquid chamber 36 of the communication substrate 25 in the support plate 42, a support plate opening portion 43 is formed in a state of penetrating in a plate thickness direction of the support plate 42. The support plate opening 43 is a penetration opening having a shape whose outline is approximately the same as that of the common liquid chamber 36 in a plan view.

Through coupling of the compliance substrate 26 to the communication substrate 25 in a state in which the alignment of the compliance substrate 26 with the communication substrate 25 is made, an opening portion of the common liquid chamber 36 in the communication substrate 25 is sealed by the compliance sheet 41 of the compliance substrate 26. Further, in a portion corresponding to the opening portion of the common liquid chamber 36, the support plate opening portion 43 of the support plate 42 is formed, and thus, this configuration enables the compliance sheet 41 disposed in this portion to be deformed (to bend) in accordance with the variation of the pressure inside the common liquid chamber 36. Moreover, through coupling of the fixing plate 19 to the lower face of the head unit 14, a lower opening of the support plate opening portion 43, that is, an opening located at a side opposite the side at which the compliance sheet 41 is coupled, is sealed by the fixing plate 19. With this configuration, the upper and lower openings of the support plate opening portion 43 are sealed, and as a result, a compliance space is defined.

The protection substrate 30 is formed on the upper face of the pressure chamber formation substrate 27, on which the piezoelectric elements 29 are formed. The protection substrate 30 is a hollow box-shaped member, and is produced from, for example, a silicon substrate. A wiring space portion 45 is formed in the center portion of the protection substrate 30 so as to penetrate in a substrate thickness direction of the protection substrate 30. In the inside of the wiring space portion 45, a coupling portion where an electrode wiring portion 32 of the piezoelectric element 29 is coupled to one end of the flexible cable 33 is disposed. Further, space portions 46 are formed in regions each facing a corresponding one of the piezoelectric elements 29. That is, more specifically, the space portions 46 are each formed at a corresponding one of both sides of the wiring space portion 45 in a direction orthogonal to the pressure chamber alignment direction. Each of the space portions 46 has a size reduced to an extent that does not interfere with the drive of the piezoelectric element 29. The space portion 46 is a space portion resulting from formation from the lower face of the protection substrate 30 (a coupling face coupled to the pressure chamber formation substrate 27) up to a halfway portion in a substrate-thickness direction toward the upper face side of the protection substrate 30. Further, through coupling of the protection substrate 30 to the pressure chamber formation substrate 27, on which the piezoelectric elements 29 are formed, in a state in which the alignment of the protection substrate 30 with the pressure chamber formation substrate 27 is made, the electrode wiring portion 32 of one of the piezoelectric elements 29 is exposed inside the wiring space portion 45, and each of the piezoelectric elements 20 is contained inside a corresponding one of the space portions 46.

The case 23 is a box-shaped member made of synthetic resin, and the communication substrate 25 is coupled to the lower face side of the case 23. The penetration space portion 47 (part of a wiring space portion) is formed in a center portion of the case 23 in a state of penetrating in a height direction of the case 23. The penetration space portion 47 communicates with the wiring space portion 45 of the protection substrate 30 so as to form a space portion in which the flexible cable 33 is contained. Further, a container space portion 48 is formed at the lower face side of the case 23 so as to back away from the lower face of the case 23 up to a halfway portion in a height direction of the case 23. The size of the container space portion 48 is set to a degree capable of containing the pressure chamber formation substrate 27, the piezoelectric elements 29, the protection substrate 30, and the like in a state in which the alignment of the case 23 with the communication substrate 25 is made. The lower end of the penetration space portion 47 communicates with the ceiling portion of the container space portion 48.

Further, case flow paths 37 are formed in the case 23 in a state of penetrating in a height direction of the case 23. The case flow paths 37 are formed at outside positions of the container space portion 48 in the case 23. More specifically, totally two case flow paths 37 each associated with a corresponding one of the common liquid chambers 36 of the communication substrate 25 are each formed at a corresponding one of both sides of the container space portion 48. Further, in a state in which the communication substrate 25 is coupled to the case 23, each of the case flow paths 37 communicates with a corresponding one of the common liquid chambers 36.

The fixing plate 19 is a metallic plate member made of, for example, stainless steel. In the fixing plate 19, an opening portion 17 is formed at a position corresponding to the nozzle plate 24 of the head unit 14. The opening portion 17 has a shape whose size is slightly larger than that of the outline of the nozzle plate 24. The head unit 14 is coupled to the upper face of the fixing plate 19 (a face located at a side opposite the side of the recording medium 6 during a recording operation) in a state in which the nozzle plate 24 is exposed through the opening portion 17. Through coupling of the bottom face of the head unit 14 (i.e., the lower face of the compliance substrate 26) to the fixing plate 19, the height of the head unit 14, that is, the position of the head unit 14 in a direction perpendicular to the nozzle plate 24, is defined. In this embodiment, the lower face of the fixing plate 19 corresponds to a position lower than the nozzle plate 24, which is a nozzle forming face of the head unit 14, by a size corresponding to the thickness of the fixing plate 19, that is, the lower face of the fixing plate 19 corresponds to a protruding face protruding to the recording medium 6 side during a recording operation. In the case where the recording head 2 is located at the home position, when the capping operation is performed by the capping mechanism 9, head edge faces (i.e., elastic members 52 each disposed at the top portion of a corresponding one of side walls 54 described later) are brought into contact with the lower face of the fixing plate 19.

In the recording head 2 having such a configuration described above, when a drive signal (drive voltage) is applied to a piezoelectric element 29 through a corresponding flexible cable 33, a bending deformation of the piezoelectric element 29 occurs in accordance with the variation of the applied voltage, and this bending deformation of the piezoelectric element 29 causes a flexible face that defines one face of a corresponding pressure chamber 31, that is, a corresponding elastic film 28, to deform in a direction approaching a corresponding nozzle 35 or in a direction away from the corresponding nozzle 35. With this deformation of the corresponding elastic film 28, a pressure variation occurs in an ink inside the corresponding pressure chamber 31, and through the use of this pressure variation, the ink is ejected (discharged) through the corresponding nozzle 35.

Next, a configuration of the capping mechanism 9 will be described.

Figure 3:
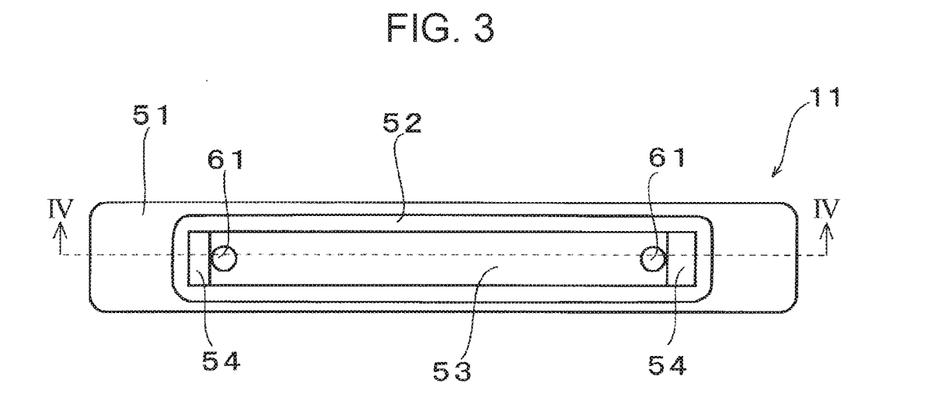
FIG. 3 is a plan view of a cap.
Figure 4:
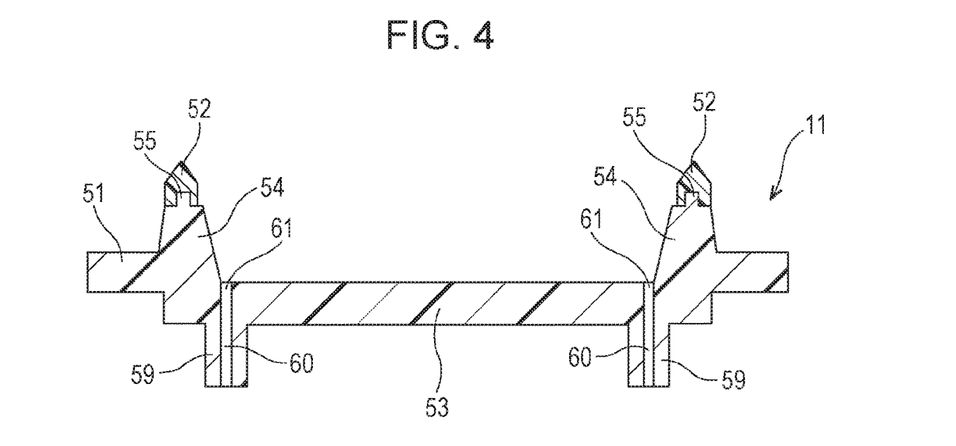
FIG. 4 is a cross-sectional view of the cap.

FIG. 3 is a plan view of the cap 11, and FIG. 4 is a cross-sectional view taken along the line IV-IV of FIG. 3.

The capping mechanism 9 includes, in addition to the cap 11, a discharge liquid tube, a suction pump, a discharge liquid tank, a cap elevation mechanism, and the like (these components being not illustrated in FIGS. 3 and 4). The cap 11 is a member that is brought into contact with the fixing plate 19 of the recording head 2 to form a sealing space 50 for sealing the nozzle plate 24 of the recording head 2, as shown in FIG. 2. The cap 11 includes a holder 51 (corresponding to the cap body in the one aspect of the invention) and the elastic member 52. The holder 51 is produced from a relatively hard synthetic resin material, that is, a modified polyphenylene oxide (modified PPE: Zylon (trademark)) material in this embodiment. The holder 51 is a member formed in a tray shape and including a bottom plate 53; side walls 54 (corresponding to the wall in the one aspect of the invention) each extending vertically from a corresponding one of four edges surrounding the bottom plate 53; and an opening at the upper face side of the member itself. In this bottom plate 53, discharge outlets 61 are formed at positions adjacent to side walls 54 located at both sides in a long side direction of the cap 11, that is, in a nozzle row direction in a capping state. The discharge outlets 61 discharge inks having been discharged 35 into the sealing space 50 from the nozzles 35. Further, on the lower face of the bottom plate 53, cylindrically-shaped discharge portions 59 are each disposed so as to project downward at a corresponding one of the positions of the discharge outlets 61, and in the inside of the respective discharge portions 59, discharge flow paths 60 are formed so as to penetrate in a thickness direction of the bottom plate 53. These discharge flow paths 60 each communicate with the upper face of the bottom plate 53 as a corresponding one of the discharge outlets 61. The above discharge liquid tube is coupled to each of the discharge portions 59. Thus, upon actuation of the suction pump in the capping state, pressure of the sealing space 50 inside the cap is made negative via the discharge liquid tubes, and this operation allows inks inside the recording head 2 to be sucked and discharged from the nozzles 35.

Further, the inner faces of side walls 54 located at both sides in the long side direction of the cap 11, that is, in the nozzle row direction in the capping state (i.e., the sealing space 50 side faces of the side walls 54 in the capping state) are inclined relative to the bottom plate 53 from the top (the upper end) of the side walls 54 toward the bottom plate 53. The lower ends of the inclines of the side walls 54 are each located adjacent to a corresponding one of the edges of the discharge outlets 61 of the bottom plate 53. This configuration facilitates guiding of inks having been adhered onto the side walls 54 to the discharge outlets 61. Further, side walls 54 located at both sides in a short side direction of the cap 11, that is, in a direction orthogonal to the nozzle row direction in the capping state, are configured to extend approximately vertically relative to the bottom plate 53. Here, the side walls 54 located at both sides in the long side direction of the cap 11 may not necessarily be inclined, and may be configured to extend approximately vertically relative to the bottom plate 53.

As shown in FIGS. 2 and 4, on each of the upper end faces (top portions) of the side walls 54, a core portion 55 constituted of a rib-shaped protrusion is formed along a corresponding one of opening peripheries of the cap 11. Further, the elastic members 52 are each formed so as to cover a corresponding one of the core portion 55. Each of the elastic members 52 is integrally constituted of a base portion 52a of a rectangular shape in a cross-sectional view and a contact portion (a rip portion) 52b having a structure tapering toward its top. The elastic member 52 in this embodiment is produced from resin having liquid repellency and elasticity, that is, specifically silicone resin. This silicone resin has not only liquid repellency and elasticity, but also heat resistance and chemical stability, and its characteristics are maintained for a long period. Thus, the silicone resin is suitable as the elastic member 52. Further, preferably, the elastic member 52 has moisture barrier properties and moisture impermeability in addition to the liquid repellency and the elasticity. From this point of view, as a raw material for the elastic member 52, employment of fluorine-based resin (fluorinated elastomer), such as fluorinated silicone resin (fluorosilicone rubber), is more preferable. When the fluorinated silicone resin is employed as the elastic member 52, the moisture barrier properties are secured. Thus, this configuration reduces liquid leakage, and maintains securing of humidity inside the sealing space 50 by the cap 11 over a further long period of time.

Further, when a capping operation is started, the cap 11 is moved upward by the elevation mechanism, and the elastic members 52 are brought into close contact with the fixing plate 19 because of its elasticity. As a result, the nozzle plate 24 is sealed inside the sealing space 50 having been defined by the close contact. In this way, at minimum, a portion included in each of the side walls 54 of the cap 11 and being brought into contact with the lower face (protruding face) of the fixing portion 19, which is a contacted portion of the bottom face of the recording head 2, is the elastic member 52 having the liquid repellency and the elasticity, and thus, even when, because of a capillarity, ink inside the cap 11 moves toward the top portions of the side walls 54 while passing through corner portions where adjacent ones of the side walls 54 intersect with each other, the ink is unlikely to be adhered onto the elastic members 52. For this reason, the adherence of the ink onto the fixing plate 19 of the recording head 2 during the capping operation is reduced. As a result, when the recording head 2 performs recording/printing of images and/or the like on the recording medium 6, tainting of the recording medium 6 by the ink having been adhered on the fixing plate 19 of the recording head 2 is reduced. Particularly, the above configuration is suitable for a configuration in which images and/or the like are recorded on the recording medium 6 in a state in which the fixing plate 19 presses the recording medium 6.

Next, a production process of the cap 11 will be described.

Figure 5:
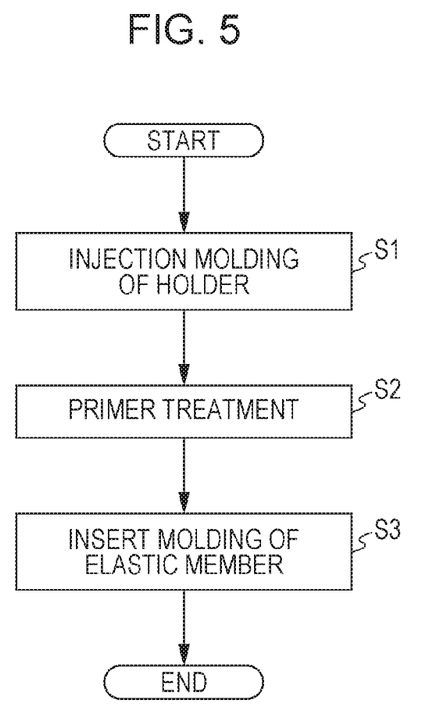
FIG. 5 is a flowchart illustrating a production method for a cap.

FIG. 5 is a flowchart illustrating a production process of the cap 11.

First, injection molding of the holder 51 is performed (step S1). That is, through the use of an injection molding machine, a modified PPE material, a material for the holder 51, is injected into a metal mold in a heated and melted condition, and then, after the completion of a cooling process, the holder 51 is molded. Next, in order to improve the closeness of contact with the elastic member 52, a primer treatment is performed on the surface of the holder 51 (step S2). For the primer treatment, any one of a wet primer treatment and a dry primer treatment is employed. In the former, that is, the wet primer treatment, a portion constituting the holder 51 and being to be in contact with the elastic member 52 is subjected to an immersion treatment or an application treatment, and then, after a dry process for a dry treatment for a period of approximately ten minutes under environment of approximately 100° C. to 200° C., the primer treatment on the relevant portion is completed. With respect to a primer treatment solvent, for example, a solvent containing a silane coupling agent, or a solvent that contains a polymer ingredient included in a raw material for the elastic member 52 and that reacts to each of the raw material for the elastic member 52 and a raw material for the holder 51 is employed. Further, in the latter, that is, in the dry primer treatment, a primer treatment on the relevant portion is performed by disposing a hydroxyl function on the surface of the holder 51, and supplying treatment gas containing a silane coupling agent by means of a CVD method to allow the hydroxyl function and the silane coupling agent to be reacted and combined with each other. In this way, surface processing on the holder 51 is performed in advance, and this surface processing further improves the closeness of the contact with the elastic member 52.

Subsequently, the elastic member 52 is integrally molded with the holder 51 by means of insert molding (step S3). The holder 51 having been subjected to the primer treatment is set into a metal mold for insert molding (not illustrated), and a raw material (liquid-state silicone resin) is injected into the metal mold. Thereafter, a heat treatment is performed to allow the elastic member 52 to be hardened. With this production process, the cap 11 including the integrally constituted holder 51 and elastic member 52 is obtained.

Here, after an elapse of 14 days in a state in which the cap 11 was immersed in water-type pigmented ink under environment of, for example, 60° C., any defect, such as deterioration or liquid leakage, was not observed with respect to the elastic member 52. Further, in an endurance test in which the elastic member 52 of the cap 11 was repeatedly brought into contact with the bottom face (the fixing plate 19) of the recording head 2 or with a plate member simulating the bottom face of the elastic member 52, even after several hundred thousand capping tests, the sealing performance of the elastic member 52 was maintained, and no change was not observed in the liquid repellency of the elastic member 52.

Here, it should be noted that, in this embodiment, an example in which the holder 51 and the elastic member 52 are integrally molded by means of the insert molding has been described because of the implementation of the primer treatment on the surface of the holder 51, but in the case where the primer treatment is not performed, a method of integrally molding the holder 51 and the elastic member 52 using a well-known two-color molding means may be employed.

Figure 6:
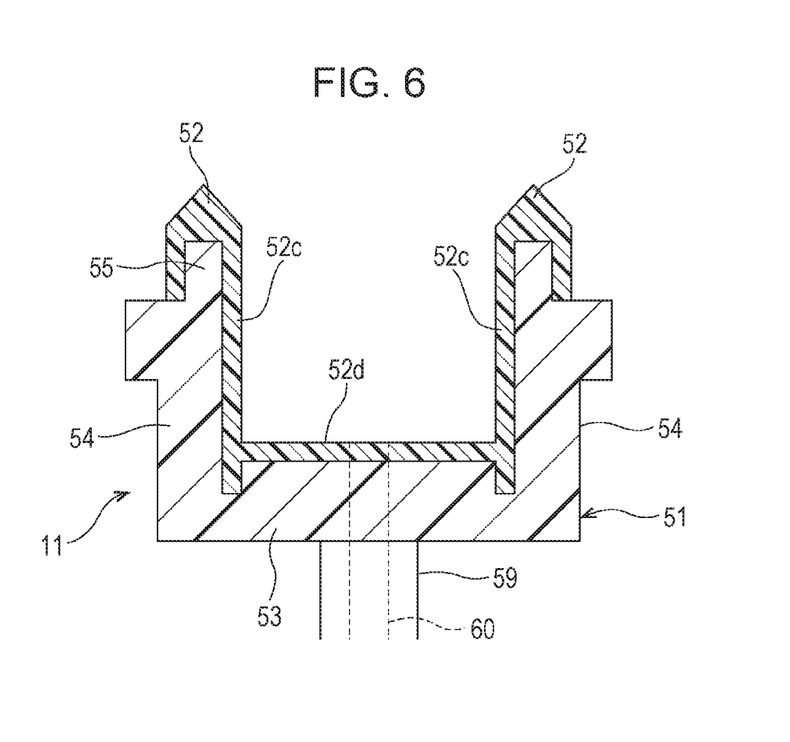
FIG. 6 is a cross-sectional view of a cap in a second embodiment.

Next, a second embodiment according to the invention will be described.

FIG. 6 is a cross-sectional view of a cap 11 according to a second embodiment of the invention, illustrating a configuration of the cap 11. With respect to the elastic member 52, in the above first embodiment, a configuration in which the elastic member 52 is disposed on the head edge face of each of the sides wall 54 (i.e., on each of the top portions to be brought into contact with the bottom face of the recording head 2) has been exemplified, but the configuration of the elastic member 52 is not limited to the exemplified configuration. In this second embodiment, elastic members 52c and an elastic member 52d are respectively formed on the inner faces of the wall sides 54 (side faces at the sealing space 50 side in the capping state) and the upper face of the bottom plate 53 (the bottom face of the sealing space 50). This configuration of allowing the elastic members 52, which have the liquid repellency, to be formed in such a way as described above, makes the ink more unlikely to leak on the inner faces (the side faces and the bottom face) of the cap 11, and further reduces the creep-up of the ink. Further, when the pressure inside the sealing space 50 becomes negative during a maintenance operation, the above configuration further facilitates discharging of the ink inside the cap 11 though the discharge outlet 61. Moreover, the above configuration makes ink more unlikely to remain in the cap 11, and in this respect, reduces the creep-up of the ink more effectively. Here, a configuration in which the elastic member 52d is not formed on the upper face of the bottom plate 53 (the bottom face of the shilling space 50), that is, a configuration in which the elastic members 52 are formed only on the top portion of the side walls 54 and the inner faces of the side walls 54, may be employed.

From a viewpoint of allowing the creep up of the ink to be reduced with more certainty, with respect to the sidewalls 54, when the surface free energy of the elastic materials 52c on the side wall 54 is denoted by γ1, the surface free energy of the elastic material 52d on the bottom plate 53 is denoted by γ2, and the, surface free energy of the body of the holder 51 is denoted by γ3, it is desirable that the above surface free energies satisfy a formula represented by γ1<γ2≤γ3. With this configuration, both of the side wall and the bottom plate of the cap 11 are allowed to keep the liquid repellency, and the ink becomes more unlikely to leak on the side wall. Thus, both of the reduction of the creep-up of the ink and the improvement of the ink elimination performance are simultaneously realized.

In the above individual embodiments, the silicone resin material (fluorine-based silicone resin material) has been described as an example of raw materials for the elastic member 52, but without limited to this example, a configuration in which a surface treatment (for example, fluorine coating) is performed to allow the surface of an elastomer material other than the silicone resign material to keep the liquid repellency may be employed. In this case, the durability performance of the cap 11 (a performance capable of maintaining the liquid repellency) reaches a performance level equivalent to approximately several ten thousand capping operations. Consequently, synthetic resin other than the silicone resin may be employed as the elastic member 52, provided that, at minimum, a portion brought into contact with the bottom face of the recording head 2 has the liquid repellency and the elasticity.

Figure 7:
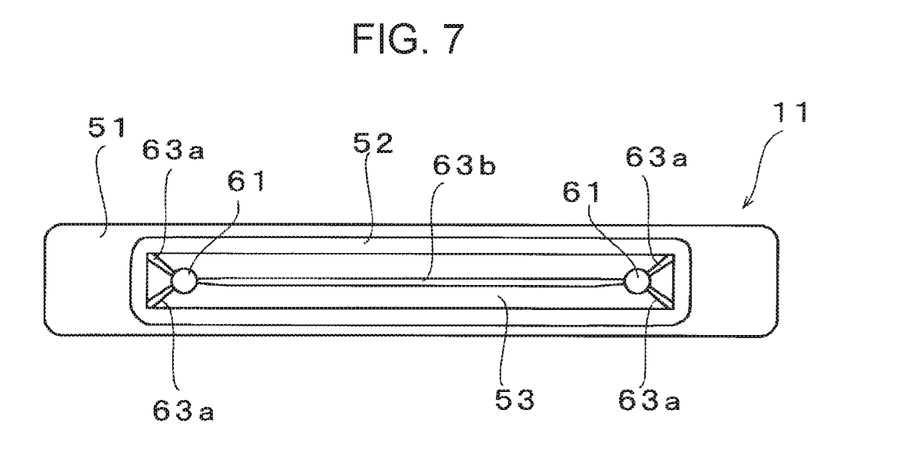
FIG. 7 is a plan view of a cap in a third embodiment.

FIG. 7 is a plan view of the cap 11 illustrating its configuration according to a third embodiment of the invention.

This embodiment is different from the above individual embodiments in that grooves 63 are formed in the upper face of the bottom plate 53 of the cap 11 (i.e., in the bottom face of the spieling space 50). The grooves 63 extend from the walls 54 to the discharge outlets 61. Further, in this embodiment, the elastic member 52*d* is not formed on the upper face of the bottom plate 63, and the grooves 63 are directly formed on the surface of the bottom plate 63. Moreover, it is desirable that any liquid repellent treatment is not performed in the grooves 63 at minimum. Configurations other than this configuration are the same as those of the above individual embodiments. More specifically, two kinds of grooves 63 are formed on the upper face of the bottom plate 63, one being a first groove 63*a* extending from a corresponding one of corner portions where adjacent ones of the side walls 54 are intersected with each other toward one of the discharge outlets 61, the other one being a second groove 63*b* through which the discharge outlets 61 communicate with each other. Further, the width of each of the grooves 63*a* and the groove 63*b* is set to a size enough to cause a capillarity in the ink. The width of each of the grooves 63*a* and the groove 63*b* is formed so as to taper toward the discharge outlets 61. With this configuration, the ink inside the cap 11 is guided toward the discharge outlets 61 because of the capillarity in the grooves 63, and thus, both of the reduction of the creep-up of the ink and the improvement of the ink elimination performance are simultaneously realized further effectively. It should be noted that the above grooves 63 are simply required to be continuously formed from the side walls 54 to the discharge outlets 61 or to be continuously formed between the discharge outlets 61.

In the description of the above embodiments, the inkjet recording head 2 has been taken as an example of the liquid ejection head, but the invention can be applied to other liquid ejection heads. For example, the invention can be applied to a color material ejection head for use in manufacturing color filters for liquid crystal displays and the like; an electrode material ejection head for use in forming electrodes for electro luminescence displays, face emitting displays (FED), and the like; and a living organic material ejection head for use in manufacturing biotips (biochemical elements). In the color material ejection head for use in display manufacturing apparatuses, as one kind of liquid, solutions for color materials in R (red), G (glean), and B (blue) colors are ejected. Further, in the electrode material ejection head for use in electrode formation apparatuses, as one kind of liquid, electrode materials in liquid form are ejected, and in the living organic material ejection head for tip manufacturing apparatuses, as one kind of liquid, solutions for living organic materials are ejected.

What is claimed is:

1. A liquid ejection apparatus comprising:
a liquid ejection head including:
a film on which a plurality of piezoelectric elements are disposed;
a first substrate having first and second surfaces opposite to each other, the first surface being fixed to the film, the first substrate having a plurality of pressure chambers therein, each of the plurality of piezoelectric elements being located directly adjacent to each of the plurality of pressure chambers;
a second substrate having third and fourth surfaces opposite to each other, the third surface being fixed to the second surface of the first substrate, the second substrate having a plurality of nozzle communication through-holes;
a nozzle plate having fifth and sixth surfaces opposite to each other, the fifth surface being fixed to a first area of the fourth surface of the second substrate, the nozzle plate having a plurality of nozzles, each of the plurality of nozzle communication through-holes being fluidly communicated between each of the plurality of pressure chambers and each of the plurality of nozzles; and
a fixing plate having a hole at a center area thereof, the fixing plate having seventh and eighth surfaces opposite to each other, the seventh surface being fixed to a second area of the fourth surface of the second substrate, the second area surrounding the first area of the fourth surface of the second substrate so that the sixth surface of the nozzle plate is completely exposed through the hole of the fixing plate; and
a cap body including a bottom plate and a wall extending upwardly from the bottom plate, an edge of the wall being directly enforced to the eighth surface of the fixing plate so that the plurality of nozzles are sealed by a space formed by the nozzle plate, the fixing plate, and the cap body,
wherein the edge of the wall is an elastic member having a liquid repellency property.

2. The liquid ejection apparatus according to claim 1, wherein the elastic member is made of silicone resin.

3. The liquid ejection apparatus according to claim 1, wherein the elastic member is formed from the portion brought into contact with the protruding portion up to a face constituting the wall and located at a side of the sealing space, and a face constituting the bottom plate and located at a side of the sealing space.

4. The liquid ejection apparatus according to claim 3, wherein, when surface free energy of the elastic member on the wall is denoted by $\gamma 1$, surface free energy of the elastic member on the bottom plate is denoted by $\gamma 2$, and surface free energy on the cap body is denoted by $\gamma 3$, the $\gamma 1$, the $\gamma 2$, and the $\gamma 3$ satisfy a formula represented by $\gamma 1 < \gamma 2 \leq \gamma 3$.

5. The liquid ejection apparatus according to claim 1, wherein a discharge outlet configured to discharge the liquid to an outside of the liquid ejection apparatus and a groove extending from the wall to the discharge outlet are formed in the bottom plate, and the groove has a width having a size enough to cause a capillarity in the liquid.

6. The liquid ejection apparatus according to claim 5, the width of the groove tapers toward the discharge outlet.

* * * * *